United States Patent [19]

Page et al.

[11] 4,165,988

[45] Aug. 28, 1979

[54] CORRECTION FLUID

[75] Inventors: Kenneth J. Page, London, England; Michael A. Scott, Huntington, N.Y.

[73] Assignee: Columbia Ribbon and Carbon Manufacturing Co., Inc., Glen Cove, N.Y.

[21] Appl. No.: 865,054

[22] Filed: Dec. 27, 1977

[51] Int. Cl.$^2$ .............................................. C09D 11/00
[52] U.S. Cl. ........................................ 106/23; 106/19; 106/26; 106/190; 106/204
[58] Field of Search ...................... 106/19, 26, 190, 22, 106/23, 204, 21; 427/259, 261, 140

[56] References Cited

U.S. PATENT DOCUMENTS

| | | | |
|---|---|---|---|
| 3,276,870 | 10/1966 | Birting et al. | 96/27 |
| 3,926,645 | 12/1975 | Strahl | 106/26 |
| 3,997,498 | 12/1976 | Reese et al. | 106/19 |

Primary Examiner—J. Ziegler
Attorney, Agent, or Firm—Thomas L. Tully

[57] ABSTRACT

Correction compositions for the masking of erroneous typed images preliminary to the typing of correct images thereover, characterized by the presence of a volatile solvent mixture having a predetermined evaporation rate at ordinary room temperatures, a high flash point and providing vapors which are non-flammable and non-toxic as a result of drying of the compositions under normal office conditions. The solvent mixtures used according to the present invention comprise methyl chloroform and perchlorethylene.

8 Claims, No Drawings

CORRECTION FLUID

BACKGROUND OF THE INVENTION

A variety of correction compositions have been commercially-available over the years. Such compositions comprise a masking pigment such as titanium dioxide, a resinous binder material such as ethyl cellulose and a volatile organic solvent for the binder material such as benzene, ethyl acetate, ethanol, trichlorethylene, or the like.

Such compositions have one or more disadvantages which render them unsafe and/or unsatisfactory for their intended function. The low boiling point hydrocarbons, ketones, esters and alcohols are flammable and represent a danger when used in the presence of an open flame such as a match lit by a typist. Moreover, such volatile solvents have rapid evaporation rates so that they evaporate from the applicator brush and from the mouth of the bottle during use, causing caking of the composition on the brush, narrowing of the inner neck of the bottle and the deposit of particles of solidified resin in the composition, which particles form an uneven masking coating over the images being covered during the subsequent use.

The use of less volatile solvents such as higher-boiling point hydrocarbons, including toluene and xylene, and certain chlorinated hydrocarbons, such as perchlorethylene, overcomes the problems of premature drying, caking, etc., and provides correction compositions which have a good levelling power, i.e., ability to form a smooth, even deposit over the image being masked prior to the evaporation of the solvent. However, such hydrocarbons are also flammable and their evaporation rate is so slow, under ambient conditions, that the typist must wait an undue length of time for the composition to dry and solidify prior to the typing of the correct image thereover, with resultant loss of time and efficiency.

Certain other solvents, such as trichlorethylene, have a satisfactory evaporation rate providing good levelling properties and rapid drying time but are dangerous to use because their vapours are dangerous to health, i.e., carcinogenic at the 100 ppm level, and it is possible to build up this concentration in an office having poor ventilation.

OBJECTS OF THE INVENTION

It is the object of the present invention to provide a masking composition having good levelling properties, a relatively rapid drying rate and evolving solvent vapors which are non-toxic or non-carcinogenic and non-flammable under ordinary ambient conditions.

This and other objects and advantages of the present invention will be apparent to those skilled in the art in the light of the present disclosure.

SUMMARY OF THE INVENTION

The novel masking compositions of the present invention comprise a film-forming binder material, an opaque pigment and a volatile solvent mixture comprising methyl chloroform and perchlorethylene. We have found that the combination of methyl chloroform and perchlorethylene provides a mixture having a good evaporation rate, non-toxicity and non-flammability under normal ambient conditions.

Methyl chloroform (1,1,1-trichlorethane), per se, has a boiling point of about 74° C. and thus provides a masking composition which dries too rapidly, has unsatisfactory levelling properties and tends to cake on the applicator brush and in the neck of the bottle, particularly when used under warm or hot ambient conditions.

Perchlorethylene, per se, has a boiling point of about 121° C. and thus provides a masking composition which dries too slowly for practical use. Also, this solvent is a health hazard in concentrations of about 100 ppm and thus is dangerous to use per se under ordinary office conditions.

We have found that the use of mixtures of methyl chloroform and perchlorethylene containing from about 20% up to about 95% by weight of methyl chloroform and from about 80% down to about 5% by weight of perchlorethylene provide an excellent solvent for correction liquids based upon resinous or film-forming binder materials which are soluble in such mixtures. Most preferably the solvent mixture contains from about 70% to about 90% by weight of the methyl chloroform so as to have a rapid drying rate.

Such mixtures have an evaporation rate which can be tailored to suit the exact preference of the user with respect to drying time of the masking composition by adjusting the relative percentages of the more volatile component, methyl chloroform, and the less volatile component perchlorethylene. The presence of at least about 5% by weight of the less volatile component reduces the evaporation rate of the mixture sufficiently that the masking composition will not dry prematurely on the applicator brush or in the neck of the applicator bottle, and permits the masking composition to level or form a smooth coating over the erroneous image during drying. The evaporation temperature of the mixture is adjustable between about 78° C. and 110° C. depending upon the ratio of the two solvents used.

Conversely, the presence of at least about 20% by weight of the more volatile component, methyl chloroform, not only provides a mixture having the desired drying rate but also provides a mixture having a sufficiently high threshold limit value that it is not a health hazard under conditions of normal office use and is therefore safe. Perchlorethylene, per se, has a threshold value limit of only 100 ppm and therefore is dangerous to use in poorly ventilated areas. However, we have found that the threshold value limit of the present mixtures of perchlorethylene and methyl chloroform (which has a threshold value limit of about 350 ppm) range from about 150 ppm up to about 335 ppm, and thus are safe to use under normal office use conditions, since such concentrations will not be exceeded under such conditions.

Aside from the novel solvent mixtures of the present masking compositions, the other ingredients of the present compositions may be the same as those used in other conventional masking compositions based upon organic solvents. Such ingredients comprise a film-forming binder material which is soluble in the solvent mixture and which dries on solvent evaporation to form a removal-resistant film, a major amount by weight of an opaque masking pigment having a color corresponding to the color of the paper on which corrections are to be made, and optional ingredients such as plasticizers to render the film-forming binder material less brittle and resistant to cracking, wetting agents to improve the dispersing of the pigment in the solvent composition, tinting agents to modify the color of the composition, etc.

The preferred film-forming binder materials are the cellulose ethers such as ethyl cellulose, hydroxyethyl cellulose, ethyl hydroxyethyl cellulose, and the like. However, other film-formers are also suitable such as polystyrene, chlorinated rubbers, acrylic resins such as methyl methacrylate, n-butyl methacrylate and isobutyl methacrylate, vinyl polymers such as vinyl chloride-vinyl acetate copolymers, and similar film-forming materials which are soluble in the solvent mixtures of the present invention.

Suitable opaque masking pigments are titanium dioxide, talc, china clay, whiting, and other conventional opaque pigments having good covering or hiding properties. The preferred material is titanium dioxide, with a small amount of fumed silica being added to give the dried composition a dull, matte finish corresponding closely to surface of most copy papers.

Various tints may be added to color the pigments blue, pink, green or other color corresponding to the color of the paper on which the composition is to be used.

Suitable plasticizers for the film-formers include dibutyl phthalate, tricresyl phosphate, castor oil and other oily liquids which are at least partially compatible with the particular film-forming binder materials used.

Small amounts of conventional wetting agents may also be included to assist dispersion of the pigments and brushability of the masking compositions over the paper being corrected.

The following example is given as an illustration of a composition coming within the present invention:

EXAMPLE

| Ingredients | Parts by Weight |
| --- | --- |
| Ethyl cellulose | 3.0 |
| Castor Oil | 4.0 |
| Wetting Agent | 2.0 |
| Titanium dioxide | 30.0 |
| Fumed silica | 1.0 |
| Perchlorethylene | 10.0 |
| Methyl chloroform | 50.0 |

The above ingredients are uniformly blended and mixed to form a homogeneous white masking composition having a threshold value limit of nearly 300 ppm and a solvent evaporation temperature of about 81° C., providing a good drying rate which permits the composition to flow or level on the copy paper while drying fairly rapidly.

The foregoing example is given by way of illustration and should not be considered limitative. Variations and modifications can be made within the scope of the appended claims.

We claim:

1. In a liquid correction composition comprising a film-forming binder material, an opaque pigment and a volatile organic solvent for said binder material, which composition is adapted to be brushed over an erroneous image and dried by evaporation of said solvent to form an opaque mask over said image corresponding to the color of the sheet carrying said image, the improvement which comprises using as said volatile organic solvent a mixture consisting essentially of from about 20% to about 95% by weight of 1,1,1-trichlorethane and from about 80% to about 5% by weight of perchlorethylene.

2. A composition according to claim 1 in which the film-forming binder material comprises a cellulose ether.

3. A composition according to claim 2 in which the cellulose ether comprises ethyl cellulose.

4. A composition according to claim 1 in which the opaque pigment comprises titanium dioxide.

5. A composition according to claim 4 in which a minor amount of fumed silica is also included.

6. A composition according to claim 1 in which the solvent mixture comprises from about 70% to about 90% by weight of the 1,1,1-trichlorethane and from about 30% to about 10% by weight of the perchlorethylene.

7. A composition according to claim 1 which also includes a plasticizer for said binder material.

8. A composition according to claim 1 which also includes a wetting agent for said pigment.

* * * * *